C. HORTON.
FRAMING MECHANISM FOR MOVING PICTURE MACHINES.
APPLICATION FILED NOV. 29, 1918.

1,438,762.

Patented Dec. 12, 1922.

Inventor
Charles Horton,
By his Attorney
W. B. Morton.

C. HORTON.
FRAMING MECHANISM FOR MOVING PICTURE MACHINES.
APPLICATION FILED NOV. 29, 1918.

1,438,762.

Patented Dec. 12, 1922.
2 SHEETS—SHEET 2.

Inventor.
Charles Horton,
By his Attorney
W. B. Morton

Patented Dec. 12, 1922.

1,438,762

UNITED STATES PATENT OFFICE.

CHARLES HORTON, OF BROOKLYN, NEW YORK, ASSIGNOR TO NICHOLAS POWER COMPANY, OF NEW YORK, N. Y., A CORPORATION OF DELAWARE.

FRAMING MECHANISM FOR MOVING-PICTURE MACHINES.

Application filed November 29, 1918. Serial No. 264,539.

*To all whom it may concern:*

Be it known that I, CHARLES HORTON, a citizen of the United States, and a resident of Brooklyn, county of Kings, city and State of New York, have invented new and useful Improvements in Framing Mechanism for Moving-Picture Machines, of which the following is a specification.

This invention relates to improvements in framing mechanism for moving picture machines, and has for its object to provide a framing mechanism in which the framing is effected by giving to the intermittent sprocket an independent advancing or retarding partial rotation as distinguished from a bodily movement of the sprocket or film-feeding devices with relation to the aperture.

Framing devices operating on this principle as heretofore used have been open to the objection that the partial rotation given to the intermittent sprocket threw it out of synchronism with the driving gear, particularly the shutter driving mechanism, so that the timing of the intermittent movement no longer registered with the passage of the wing of the shutter over the projection aperture, causing the so-called "ghost" effect in the picture, due to the movement of the film while the screen is illuminated.

To overcome this difficulty, it has heretofore been proposed to provide the shutter-driving mechanism with an independent driving connection operative with the framing mechanism to advance or retard the shutter simultaneously with the framing movement to maintain the properly timed relation between the film movement and the shutter.

This shutter adjusting mechanism adds unnecessarily to the cost and complication of the machine and I have found it not altogether satisfactory for various reasons.

The object of the present invention is to provide a framing device in which the axis of rotation of the intermittent sprocket is stationary and in which the framing is effected by giving to the sprocket an independent advancing or retarding movement, but in which the independent movement of the sprocket does not affect its time of operation in the feed movement cycle, so that the relation of the shutter and the feed movement is not altered by the framing, and the adjustment, once made, will remain correct until extraneously altered.

A further object of the invention is to provide an intermittent drive for the sprocket involving a framing mechanism of the character indicated, in which the entire sprocket and its driving mechanism may be removed as a whole without disassembling the two parts of the intermittent couple or changing their adjustment, and another unit substituted in a moment's time, and with the use of no other tool than an ordinary screw driver.

A further object of the invention is to provide a simple, compact film-driving and framing mechanism in which the gearing, including the intermittent couple, may readily be installed in oil-tight cases to minimize the noise and wear of operation.

Further objects of the invention will appear from the following description when taken in connection with the accompanying drawings, wherein I have illustrated a preferred embodiment of the invention as applied to a moving picture machine of standard design.

In the drawings,

Fig. 4 is a diagrammatic view showing the relative movement of the several parts.

Figure 1:
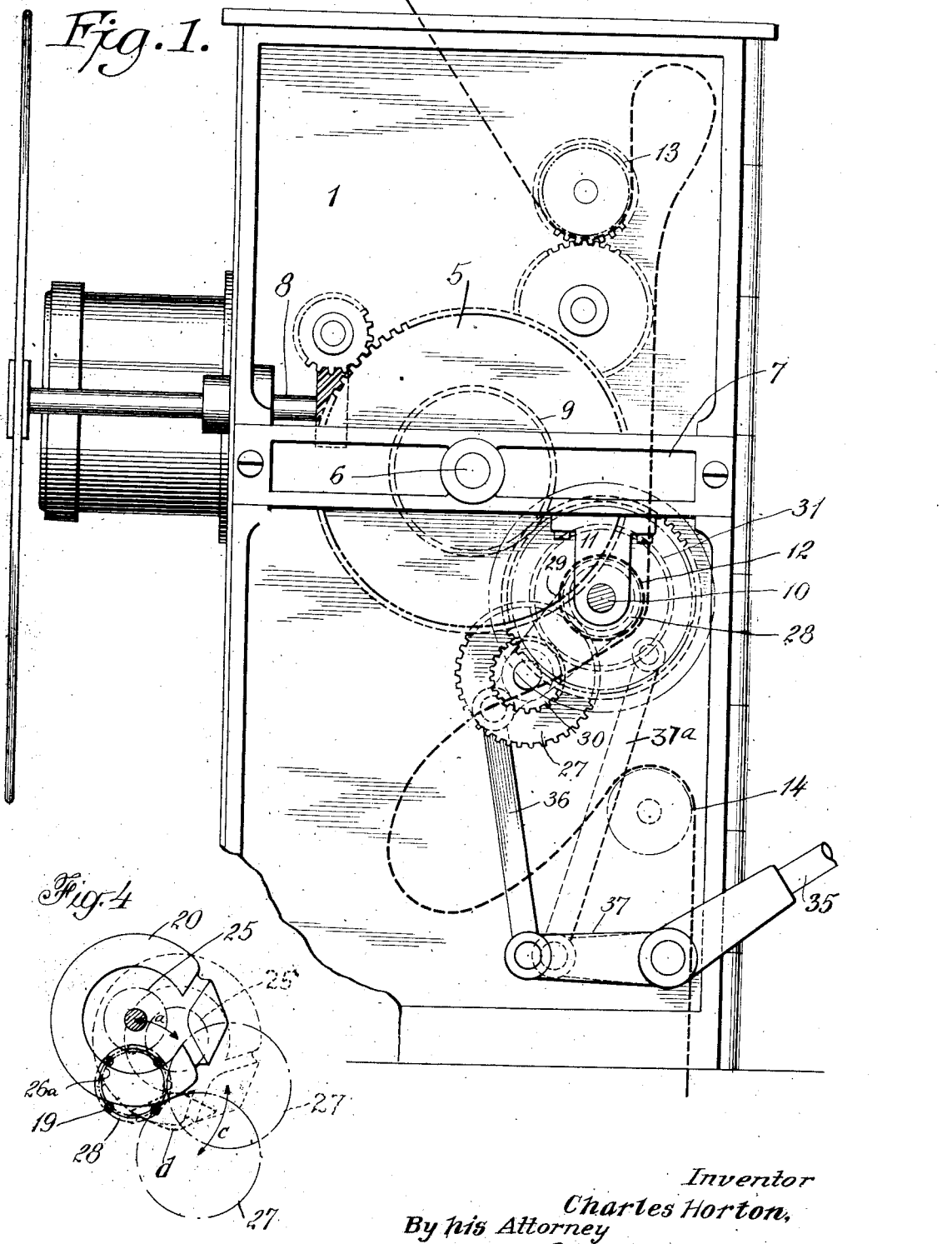
Figure 1 is a side elevation of the gear casing of a moving picture machine showing the arrangement of the driving gears for operating the various film sprockets and shutter in properly timed relation.

Referring to the drawings, 1 indicates the frame of the moving picture machine, here shown as comprising a vertical web 2 on which the various driving shafts and gears are supported. The web 2 forms the side wall of the gear casing 3 in which the gears are enclosed, the outer walls 4 of the gear casing being removable to give access to the mechanism as may be necessary for cleaning or repairs.

As shown, the gearing comprises essentially a shaft 6 whose outer end is carried by a cross-bar 7 bridging the open side of the gear casing between the upper and lower parts of the detachable wall 4. This shaft carries the gear 5 from which the shutter shaft 8 is continuously operated and also carries the gear 9 through which a shaft 10 below the cross-bar 7 is also continuously driven, this shaft being supported in a fixed bearing carried by a bracket 11 attached to the cross-bar. The shaft 10 constitutes the driving shaft for the intermittent sprocket 12 and the upper and lower sprockets 13 and 14 are likewise driven from the master shaft by any suitable gearing, not shown in detail, but designed to drive the three sprockets in such timed relation that all complete a full revolution in the same interval.

The intermittent sprocket 12 is supported by a disk or plate 15 mounted for rotation about the axis of the sprocket in a bearing ring 16 attached to the face of a plate 17, which plate is in turn fixedly attached to the face of the web 2 by means of suitable screws 18 so that the entire plate and its supporting mechanism may be removed as a unit without interfering with the relative positions of the parts.

The intermittent sprocket is here shown as driven by an intermittent couple comprising a pinwheel 19 and a driving cam 20 of the kind shown in the patent to Nicholas Power, No. 1,129,121, granted February 23, 1915, but it will of course be understood that any other form of intermittent couple for example, a Geneva gear, may be used if desired. The shaft 21 of the cam 20 is supported in the plate 15 by means of a tubular bearing 22 integral with the plate and projecting therefrom in parallelism with the shaft of the sprocket, the sleeve being provided at its outer end with a projecting lug 23 forming an outer bearing for the end of the sprocket shaft. The shaft 21 is preferably provided at its end with a flywheel 24 for maintaining the shaft 21 at a uniform speed of rotation.

The shaft 21 is driven from the shaft 10 through the medium of a pinion 25 attached to the end of the shaft 21 and driven from a corresponding pinion 26ª attached to the end of an idle shaft 26, which shaft is supported in a fixed bearing in the web 2 and in alignment with the axis of rotation of the sprocket shaft and its supporting plate 15.

The shaft 26 is driven through an epicyclic train comprising a gear 27 meshing with the pinion 28 on the end of the shaft 26, the shaft of the gear 27 being carried by a hangar 29 which is supported for rotation adjustment on the bearing of the shaft 26 and about the axis of the shaft.

The shaft of the gear 27 carries a pinion 30 in mesh with a gear 31 on the end of the shaft 10, the gears being proportioned so as to provide a multiplying gear to drive the shaft 26 at a greater speed than the shaft 10.

Figure 2:
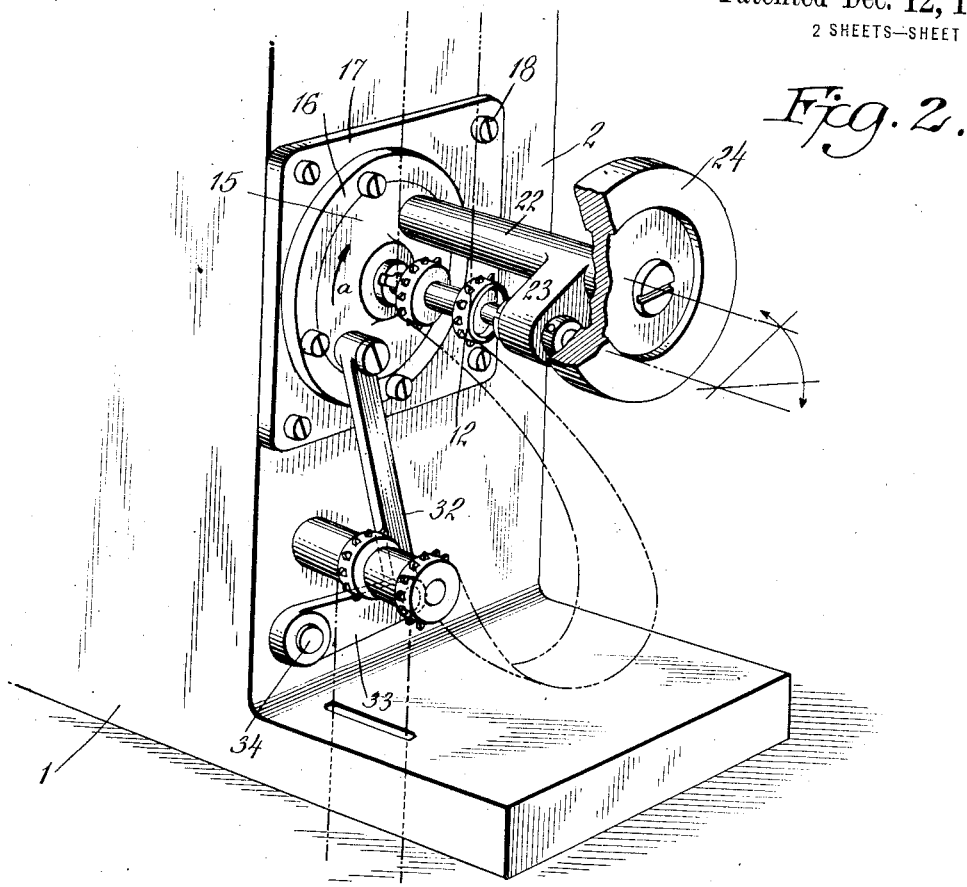
Fig. 2 is a perspective view of the lower part of the machine showing the intermittent sprocket and its connections whereby it may be independently rotated to frame the picture.
Figure 3:
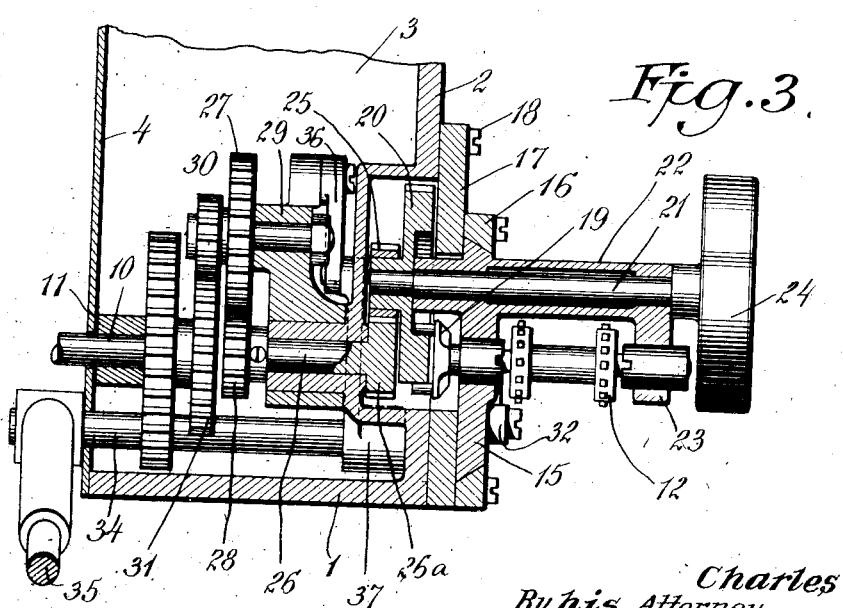
Fig. 3 is a horizontal section at the plane of the shaft of the intermittent sprocket showing the driving shaft of the intermittent couple also in the same plane.

It will be observed that the plate 15 and bracket 29 are rotatively adjustable about the same axis, that is, the axis of the aligned shafts 10, 26, and the sprocket shaft. To effect the framing of the picture the plate 15 is adjusted by means of a link 32 attached to the plate as shown more particularly in Fig. 2, and operated from the crank arm 33 on a rock shaft 34 extending across the bottom of the gear casing, the rockshaft being adjusted by means of the usual framing handle 35 attached to its outwardly projecting end. The bracket 29 is also rotatively adjusted by the framing lever but in the opposite direction, the rotation being effected through the medium of a link 36 and a crank arm 37 also attached to the shaft 34, the link being connected to a projecting ear carried by the bracket 29.

The operation of framing which is effected by the adjustment of the lever 35 is as follows: It will be assumed that the driving shaft 10 is momentarily stationary at the time the framing is effected and that the framing lever 35 is depressed to thereby raise the link 32 and turn the disk 15 in a clockwise direction as viewed in Figs. 2 and 4, that is, in the direction of the arrow a. This adjustment produces a partial rotation of the sprocket about its own axis through the engagement of the driving pins of the member 19 with the opposite edges of the cam 20, which movement shifts the film up or down, as the case may be, and "frames" the picture. This movement of the sprocket is clearly shown in Fig. 4 by the positions of the parts indicated in full and dotted lines, respectively. But as a second effect, were it not for the compensating epicyclic gear, the cam shaft 21 would also be rotated on its axis by reason of the rotation of the pinion 25 around pinion 26ª, the effect of which would be to advance the operating projection of the cam toward the driving member 19 of the sprocket, as shown at d in heavy dotted lines in Fig. 4, with the result that the moment of operation of the sprocket would be advanced and the film feed thrown out of synchronism with the shaft.

The compensating mechanism, which comprises the planetary gear train between the shafts 10 and 26 and the connections of the supporting bracket 29 with the framing lever effects this compensation by rotating the shaft 26 and gear 26ª in a clockwise direction, as shown in Fig. 4 upon the framing movement just described to an extent such that the counterclockwise rotation given to the gear 25 by such rotation of the shaft 26 will be equal to the clockwise rotation produced by the rotation of the gear with the plate 15 around the pinion 26ª, so that the relative positions of the operating projection of the cam 20 of the driving member 19 of the sprocket shaft will remain unaltered.

To this end the link 36 is connected to the bracket 29 so as to turn the bracket in the direction opposite to the direction of rotation of the disk 15 upon the same movement of the framing lever, as indicated by arrow C (Fig. 4).

As viewed in Fig. 1, the depression of the framing lever will rotate the bracket 29 in a clockwise direction, but as this view shows the parts from the side opposite to that shown in Fig. 4, a clockwise movement in this figure corresponds to a counterclockwise movement in Fig. 4. The adjustment of the bracket produced by depressing the framing handle, that is, in the direction of the arrow C, (Fig. 4) causes the pinion 30 to roll around the stationary gear 31, thereby producing a rotation of the pinion 30 and connected gear 27 about their axis also in a clockwise direction.

The gear 27 is of larger diameter than the pinion 30, also the pinion 28 is smaller than the gear 31, hence the rotation of the gear 27 will cause a greater advance of the pinion 28 than compensated for by the bodily movement of the gear around the axis of the pinion 28, with the ultimate result that the pinion 28, and also the pinion 26ª, are rotated in a clockwise direction as viewed in Fig. 4, and therefore compensate for the movement of the disk 15 as already explained.

It will of course be understood that the points of attachment of the links 36 and 37ª from the center of rotation and the lengths of the levers 37, 33 are so correlated with the sizes of the several gears that the rotation of the shaft 21 on the adjustment of the disk 15 will be exactly equalled by the counter-movement effected through the adjustment of the bracket 29.

The structure presents several advantages over the framing mechanisms now in use. By confining the compensating gear to the intermittent sprocket the three sprockets are maintained in synchronism with each other as well as with the shutter. Also, as before pointed out, the entire intermittent couple with its bearings, etc., can be removed as a unit by simply taking off the plate 17 and withdrawing the pinions 25, 26ª from engagement with each other.

The structure also lends itself well to the provision of rigid bearings for the shaft 21 and the sprocket shaft in the same bracket whereby suitable adjustment is provided for the sprocket shaft to prevent lost motion between the cam and the pin wheel 19 where lost motion must be avoided to maintain sharp definition in the picture.

I claim:

1. In a framing mechanism for motion picture machines, the combination of an intermittent sprocket, a driving mechanism therefor comprising an intermittent couple for driving said sprocket, said couple having its driven member fixedly connected to said sprocket, a gear train for driving said intermittent couple and means for adjusting a portion of said gear train to effect a partial rotation of said sprocket without changing its time of intermittent operation.

2. In a framing mechanism for motion picture machines, the combination of an intermittent sprocket, a driving mechanism therefor comprising an intermittent couple for driving the said sprocket, said couple having its driven member fixedly connected to said sprocket, a movable bearing for supporting the driving member of said couple, and means for adjusting said movable bearing to effect a partial rotation of said sprocket in addition to its intermittent movement without altering its time of operation.

3. In a framing device for motion picture machines, the combination of an intermittent sprocket, means for driving the sprocket comprising an intermittent couple having its driven member mounted on the shaft of the sprocket, a support for the driving member of the couple, said support being mounted for adjustment around the axis of the sprocket in a path concentric therewith, a member for operating the driving member of said couple, means for adjusting said movable support for the driving member of the intermittent couple to effect a partial rotation of the sprocket, and means for simultaneously effecting a partial rotation of the actuating member therefor.

4. In a framing device for motion picture machines, the combination of an intermittent sprocket, means for driving the sprocket comprising an intermittent couple having its driven member mounted on the shaft of the sprocket, a support for the driving member of the couple, said support being mounted for adjustment around the axis of the sprocket in a path concentric therewith, a member for operating the driving member of said couple, said member having its axis of rotation in alignment with the axis of rotation of the sprocket whereby the revolution of the driving member of the couple produces a partial rotation about its own axis, means for adjusting said movable support for the driving member of the intermittent couple to effect a partial rotation of the sprocket, and means for simultaneously effecting a partial rotation of the actuating member therefor, to compensate for the partial rotation of the driving member of the intermittent couple.

5. In a framing mechanism for motion picture machines, the combination of an intermittent sprocket, a continuously rotated shaft for driving the same, fixed bearings for said shaft, means for maintaining the shaft of the sprocket in actual alignment with said first mentioned shaft, an intermediate shaft mounted for rotation in alignment with said other two shafts, an intermittent couple for driving said sprocket, said couple having its driven member attached to the shaft of said sprocket, driving connections between said driving shaft and said intermediate shaft, and between said intermediate shaft and the driving member of said intermittent couple, means for adjusting the driving member of said couple to effect partial rotation of said sprocket for framing the picture, and means for simultaneously effecting a partial rotation of said intermediate shaft to thereby maintain the time of intermittent operation of said sprocket unaltered.

6. In a framing mechanism for motion picture machines, the combination of an intermittent sprocket, a continuously rotated shaft for driving the same, fixed bearings for said shaft, means for maintaining the shaft of the sprocket in actual alignment with said first mentioned shaft, an intermediate shaft mounted for rotation in alignment with said other two shafts, an intermittent couple for driving said sprocket, said couple having its driven member attached to the shaft of said sprocket, epicyclic gearing connecting said driving shaft and said intermediate shaft, and said intermediate shaft and the driving member of said intermittent couple, means for adjusting the driving member of said couple to effect partial rotation of said sprocket for framing the picture, and means for simultaneously effecting a corresponding adjustment of the epicyclic driving gear for said intermediate shaft to thereby compensate for the partial rotation of the driving member of said couple produced by its adjustment.

7. In a framing mechanism for motion picture machines, the combination of an intermittent sprocket, bearings for said sprocket, a member for supporting said bearings, said member being mounted for rotative adjustment about the axis of said sprocket, an intermittent couple for driving said sprocket, said intermittent couple having its driven member attached to the sprocket shaft, a shaft for its driving member also mounted on said support, means for detachably mounting said support on the motion picture machine frame, intermeshing gears between the driven member of said intermittent couple and a driving shaft on said fixed frame, said gears being so arranged with relation to said detachable support as to be separated by the removal of said support and the intermittent couple and attached parts without disturbing the connection of either gear and its shaft.

8. In a framing mechanism for motion picture machines, the combination of an intermittent sprocket, bearings for said sprocket, a member for supporting said bearings, said member being mounted for rotative adjustment about the axis of said sprocket, an intermittent couple for driving said sprocket, said intermittent couple having its driven member attached to the sprocket shaft, a shaft for its driving member also mounted on said support, a gear for driving said shaft mounted on the moving picture machine, a gear on the driving shaft of said intermittent couple, and means for detachably connecting said support to the machine frame with the axis of rotation of the sprocket in alignment with the axis of rotation of said gear and with said gears in mesh when said support is so connected, said gears being positioned to be separated by the removal of said support without disturbing the connection of either gear with its shaft.

Signed at New York, in the county of New York and State of New York, this 11th day of October, 1918.

CHARLES HORTON.